Oct. 13, 1936.  C. CRISWELL  2,057,136
TORQUE LOADING DEVICE
Filed Dec. 12, 1932  2 Sheets-Sheet 1

Inventor
Carmer Criswell
By Blackmore, Spencer & Flint
Attorneys

Oct. 13, 1936.　　　C. CRISWELL　　　2,057,136
TORQUE LOADING DEVICE
Filed Dec. 12, 1932　　　2 Sheets-Sheet 2

Inventor
Carmer Criswell
By Blackmore, Seward & Flint
Attorneys

Patented Oct. 13, 1936

2,057,136

UNITED STATES PATENT OFFICE 2,057,136

TORQUE LOADING DEVICE

Carmer Criswell, Detroit, Mich., assignor, by mesne assignments, to General Motors Corporation, Detroit, Mich., a corporation of Delaware Application December 12, 1932, Serial No. 646,841

8 Claims. (Cl. 74—208)

This invention relates to frictional power transmitting mechanism of a type that comprises races and rollers in rolling contact associated with means to vary the degree of axial loading pressure applied to the races in proportion to the magnitude of the tractive forces applied between races and rollers.

It is desirable in transmission mechanisms of this type to load the races and rollers only moderately in excess of that load which is necessary to prevent slippage of the engaging surfaces while rotating in contact. As the input forces and output forces vary widely during operation of the transmission mechanisms, particularly in motor vehicles, for which this invention is primarily intended, the loading pressure should vary in degree in accordance with the variation of the input and output tractive forces.

It is an object of this invention to maintain the axial loading force acting on the races, to force them into tractive contact with rollers, always proportionate to the magnitude of the applied tractive forces during operation of the transmission mechanism.

The invention is herein disclosed as embodied in a motor vehicle transmission mechanism comprising two alined shafts, one of which is a driving and the other a driven shaft; three races coaxial with one of said shafts, the two end races being torsionally fast to one of the shafts and the center race rotatable about it and torsionally connected to the other shaft; intermediate adjustable rollers between said races in tractive contact with them; supporting means for the rollers permitting slight movement of the roller centers angularly about the axis of the shaft in response to the input and output forces applied tangentially to the rollers, and torque loading means rendered effective by the stated movement of the roller supporting means for pressing the races and rollers into mutual engagement. In the illustrated embodiment the races have toroidal raceways and the rollers are susceptible of tilting in order to assume different angular positions in radial planes including the race axis and roller centers whereby the driven races may be rotated at different speeds relative to the driving race. The center race has a toroidal raceway in each face and is, therefore, the equivalent of two races rigidly united.

Figure 1:
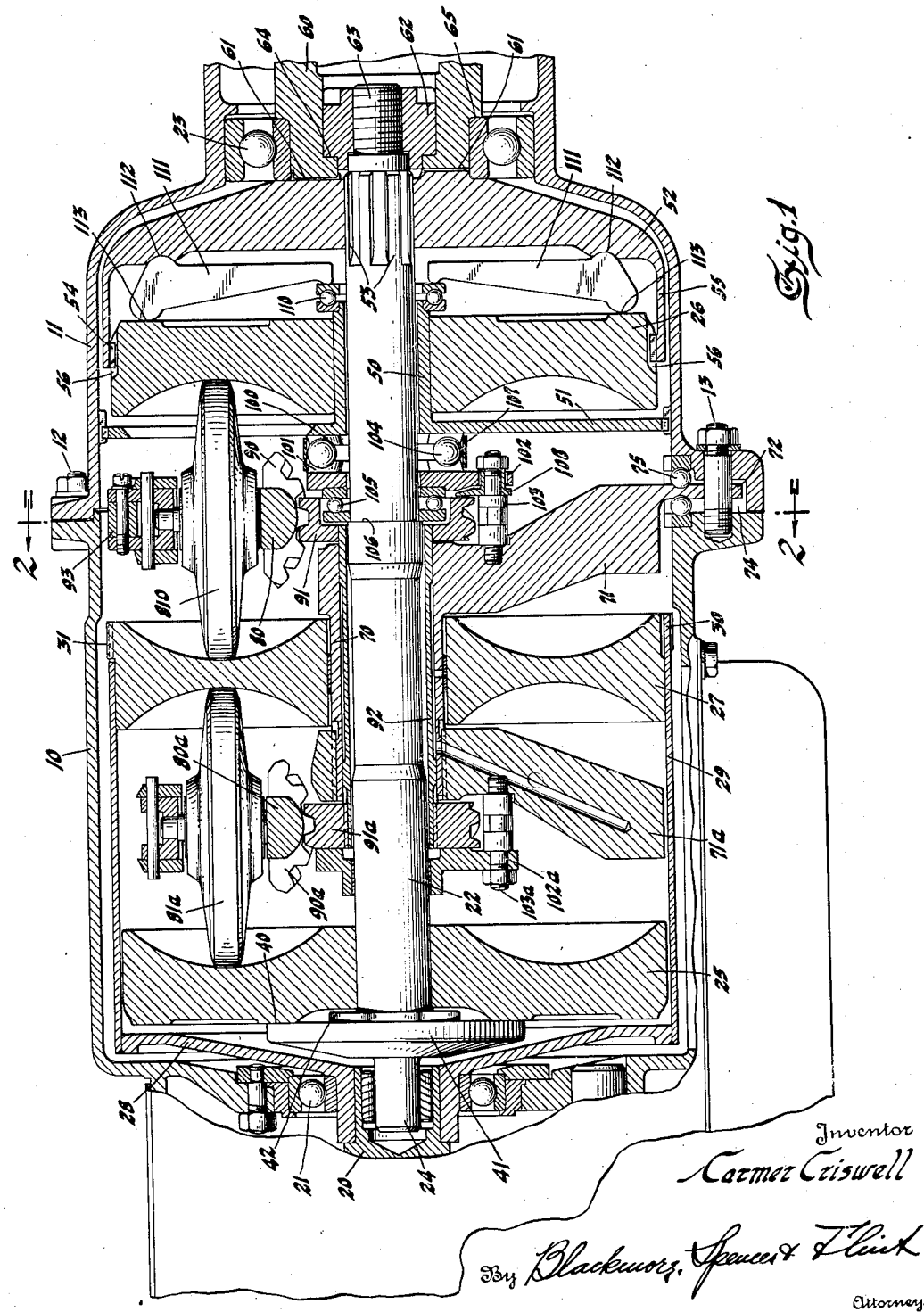
Figure 2:
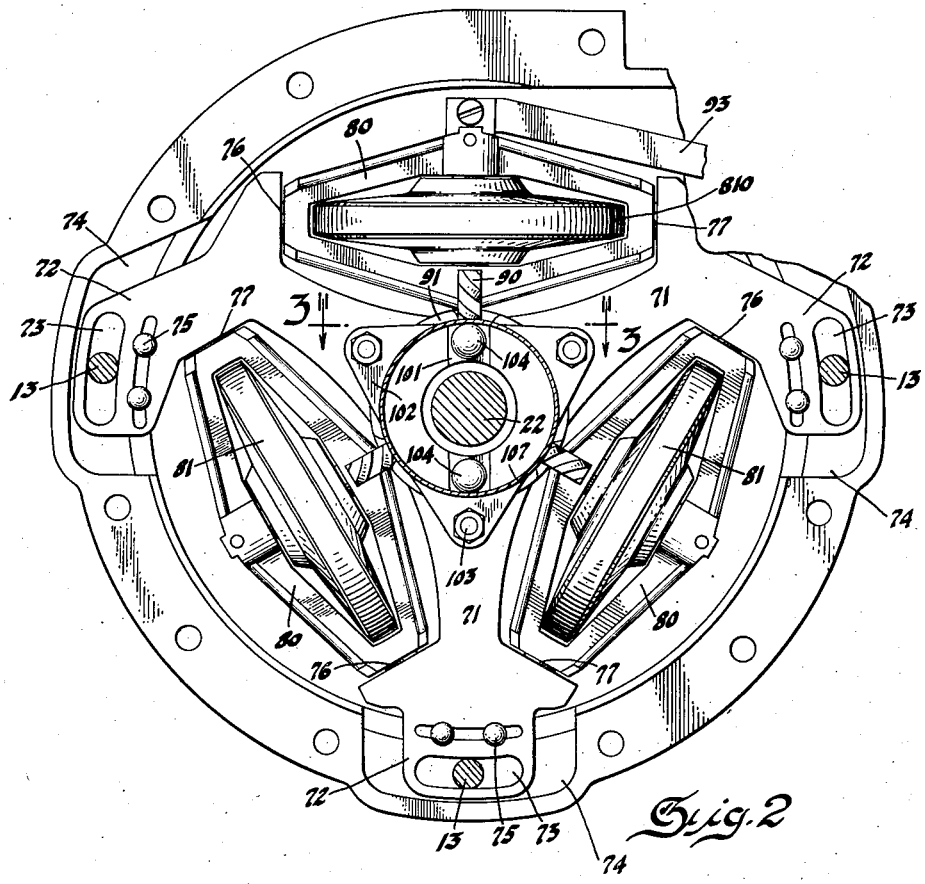
Figure 3:
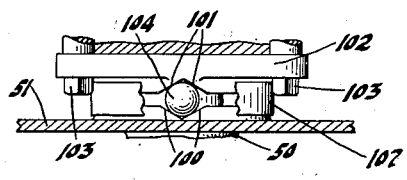

In the accompanying drawings, in which like reference characters indicate like parts throughout the several views, Fig. 1 is a longitudinal section on a vertical axial plane of a double toric friction power-transmission mechanism and its casing;

Fig. 2 is an elevation of the forward section of the casing and enclosed mechanism viewed in the direction of arrows 2—2 in Fig. 1, the rear section of the casing having been removed and the output shaft severed, and Fig. 3 is a detail view on line 3—3 of Fig. 2 of the torque loading means.

In Fig. 1 numerals 10 and 11 indicate respectively the front and rear sections of a sectional casing that houses the races, intermediate rollers and associated parts of a friction power transmission mechanism. Sections 10 and 11 are provided with circumferential flanges secured together as by bolts 12 and 13.

The power input shaft 20 is rotatable in a bearing 21 disposed in the forward end wall of the casing, while power output shaft 22, at its rear end, is rotatable in bearing 23 supported in the rear end of the casing. The front end of power output shaft 22 is piloted in the rear end of power input shaft 20 in the usual way as indicated at 24.

The power of a prime mover, such as an internal combustion engine, adapted to be coupled to input shaft 20, may be transmitted to output shaft 22 at different mechanical advantages by means of races and intermediate adjustable rollers as shown in the drawings. In the illustrated embodiment toric races 25 and 26 are driven races secured to the output shaft 22 adjacent the front and rear ends, respectively, so that the driven shaft and driven races are compelled to rotate in unison. The double faced toric race 27 disposed between said races 25 and 26 is the driving race, which is so mounted that it may rotate freely about the axis of shaft 22 and slide axially thereof a limited extent. Obviously the action may be reversed so that race 27 may become the driven race. Race 27 is, as shown, rigidly coupled torsionally with power input shaft 20 by means of flange 28, secured to the rear end of said power input shaft, and the driving cage or drum 29 welded to or otherwise made rigid with the flange. The cage or drum 29 is in driving connection with the perimeter of driving race 27. The connection between race and drum is preferably composed of fingers 30 on the rear end of the cage, intercalated with separated lands 31 on the race in a known manner. Race 27, therefore, cannot rotate with respect to the driving cage 29 although some relative axial movement of cage and race is possible.

Forward driven race 25 is secured to shaft 22 with the thrust zone 40 on the forward side thereof abutting against thrust receiving flange 41 integral or otherwise rigid with the shaft. Radially inside of the thrust zone 40, race 25 is formed with radial grooves adapted to receive neatly fitting radial drive keys or lugs 42 rigid with the shaft 22 and abutment flange 41. By this construction and arrangement race 25 is keyed to shaft 22 so that there can be no relative movement of rotation and no movement of the race axially on the shaft by reason of axially directed force imposed by the torque loading device to be described later.

Driven race 26 is sleeved upon a tubular thrust member 50, which is prevented from rotary movement by arms 51 rigid with it, the outer ends of which arms are united to the transmission casing by means such as cooperating splines and grooves that prevent rotary displacement but permit some axial movement for a purpose to be explained. Race 26 is locked to shaft 22 torsionally by means of flanged torque and thrust receiving member 52 which is keyed to shaft 22 at 53 and keyed to the perimeter of the race by means of internal axially extending teeth 54 and grooves formed within the flange 55 cooperating with axially extending grooves and teeth 56 on the outer perimeter of the race. By this construction the race 26 must rotate with the torque and thrust receiving member 52 and shaft 22 to which member 52 is keyed, but has some axial movement relative to member 52.

Rearward of member 52 is torque transmitting coupling 60, having teeth or dogs 61 interlocked with cooperating teeth or dogs on the rear of member 52. Coupling 60 surrounds an adjusting nut 62 threaded on the reduced rear end 63 of the shaft 22, this nut bearing against an internal shoulder 64 within the coupling. The coupling thus supports and centers the rear end of shaft 22 and is itself centered and rotatable in bearing 23. The inner race of bearing 23 rests between a shoulder 65 on coupling 60, and the rear surface of member 52. Enough clearance is provided in the casing to permit the needful longitudinal movement of the bearing. Therefore the means for mounting the assembly in the rear end of the casing permits axial movement of member 52, bearing 23, coupling 60, nut 62, shaft 22 and race 25, as a unit, in order to permit pressure to be distributed between races and rollers in a manner that will be revealed hereinafter.

Driving race 27 is shown as mounted so as to rotate freely on a sleeve 70 disposed concentrically with and surrounding driven shaft 22 and to move axially thereon a limited extent as previously stated. Sleeve 70 is provided with arms 71 and 71a radiating from opposite ends between the driving and the driven races. Sleeve 70 and radiating arms 71 constitute one rigid part in the assembly. Arms 71a radiate from a hub splined on the forward end of sleeve 70 to permit some relative axial movement. Arms 71a are devoid of support at their outer ends while arms 71 are secured to the casing in such manner that arms 71, sleeve 70 and arms 71a may move angularly as a unit about the shaft axis a limited extent, but arms 71 and sleeve 70 cannot move in an axial direction relative to one another or to the casing. The transmitting rollers between the driving and driven races are mounted on the arms 71 and 71a by means to be described.

Each arm 71 is provided with a flat terminal 72, disposed in a plane transverse of the axis of shaft 22, having in it an arcuate slot 73. Each terminal projects into a space 74 formed in the casing substantially at the joint between the two sections 10 and 11. Bolts 13 pass thru the slots in terminals 72 thus permitting a limited angular movement of arms 71 and, therefore, of the entire roller supporting unit. Ball bearings 75 prevent any movement of the arms 71 and sleeve 70 relative to the casing in a direction parallel with the axis of shaft 22 while permitting arms 71a a relative axial movement and affording some freedom of angular movement of the sleeve 70 and both sets of arms.

Three radiating roller supporting arms are shown on each side of the center driving race providing for the support of two sets of three rollers each. As shown in Fig. 2, each rearward disposed arm 71, adjacent its end, is formed with flat surfaces 76 and 77 upon opposite sides. These surfaces lie in planes parallel with the axis of shaft 22, diverging symmetrically one from the other 120°. Since there are three arms as shown in Fig. 2, symmetrically disposed 120° apart, the surface 76 of one arm is parallel with the surface 77 of the adjacent arm to the right. Between the surfaces 76 and 77 of adjacent arms, roller carriers 80 are pivotally supported so that each may tilt about its axis extending thru the pivotal supports. Each carrier 80 is an oblong frame having a central opening adapted to receive a roller for transmitting the rotation of the driving race to a driven race. In one of the carriers 80 a master roller 810 is rotatively mounted and in the other two carriers 80 follower rollers 81 are mounted. The carriers may rock or "tilt" about their axes in order to vary the ratio position of the rollers in a manner well understood.

Arms 71a also support carriers 80a and follower rollers 81a that are similar to the carriers 80 and rollers 81 shown in Fig. 2. Arms 71a differ from arms 71 only in that the former are unsupported at their extremities and may move somewhat in an axial direction on sleeve 70 as has been previously disclosed.

The rollers 810, 81 and 81a may also incline within the carriers about an axis intersecting their points of contact with the races, in order that they may be steered into new "tilt" or ratio positions, and one of the rollers, namely roller 810, serves as stated as a master roller, which is inclinable at the will of the operator through control means 93 (Fig. 2), the other rollers following the inclining and tilting movements of the master roller by means forming no part of this invention and fully disclosed and explained in application Serial Number of 614,332 filed May 31, 1932. Suffice it to state that if master roller 810 be inclined within its carrier it steers itself to a new ratio position thereby causing its carrier to tilt about its axis; that frames 80 have helical gear segments 90 rigid with them, while frames 80a are similarly provided with segments 90a; that segments 90 mesh with helical gear 91 fixed to a torque tube 92 sleeved over shaft 22 within sleeve 70 and segments 90a mesh with helical gear 91a splined on the torque tube. Thus when master roller 810 is inclined by an external effort applied thru control element 93 it begins to tilt to a new ratio position, and thereby imparts a torsional force to the gears 91 and torque tube 92 by the action of the helical gear segment on the carrier for the master roller; and the torque tube and helical gears thereupon impart a force to all the other carriers which is effective to steer the other rollers into the same ratio position as that assumed by the master roller.

Helical gears 91 and 91a are mounted on tube 92 so as to rotate therewith. Rearward gear 91 may be welded or otherwise rigidly joined to the tube. The forward gear 91a may be splined on said tube and capable of slight axial movement thereon. The rearward gear 91 is disposed between the rear end of sleeve 70 and a spacing member 108 spaced therefrom by bolts as hereinafter more fully described. The forward gear 91a is disposed between the hub of roller supporting arms 71a and a collar 102a spaced from the arms 71a by bolts 103a. Arms 71a and, therefore, collar 102a may move somewhat axially since the arms 71a are splined to sleeve 70. Helical gear 91a may also move axially with any axial movement of the arms 71a and collar 102a.

The torque loading means adapted to impart to the races an axial force which is directly proportional to the tractive force between rollers and races, and which constitutes the subject matter claimed herein, will now be described.

The forward face of tubular thrust member 50 is provided with cam seats having divergent (as indicated in Figs. 1 and 3) or oppositely inclined surfaces 100. Opposed to the surfaces 100 are surfaces 101 inclined in the opposite sense, said surfaces 101 being formed on a collar 102 fixed torsionally to the arms 71, but so as to be capable of slight axial movement relative to said arms, by bolts 103 which also keep said spacing member 108 spaced from said arms to afford room for the described helical gear member 91 and permit free angular movement thereof. Hard balls 104 are seated between said surfaces 100 and 101 and it will be apparent that any relative angular movement between the thrust member 50 and the collar 102 will apply opposing axial thrusts to member 50 and collar 102. The balls 104 are prevented from radial displacement by retainer ring 107. Thrust bearing 105 is interposed between collar 102 and a shoulder 106 on shaft 22. Axial thrust exerted on collar 102 by the action of the loading devices consisting of cam surfaces 100, 101 and balls 104 will be taken by the shoulder on shaft 22 and will not be transmitted to arms 71 and sleeve 70.

The rearward end of thrust sleeve 50 is in contact with a thrust bearing 110 interposed between the thrust sleeve and the ends of the long arms of levers 111 of the first order. Levers 111 bear at 112 on the forward surface of member 52 and at their outer ends bear at 113 against race 26 in a zone near its periphery. Levers 111 may possess, it is apparent, a high mechanical advantage due to the great length of the power arm as compared with the length of the work arm, and may be elastic to provide for preloading the races and rollers in order to avoid any looseness during periods of quiescence or light driving.

If input shaft 20 be rotated clockwise by the engine (viewed from the left hand end of Fig. 1) driving race 27 will rotate clockwise and thru the rollers will cause races 25, 26 and shaft 22 to rotate counter clockwise, delivering power thru coupling 60 to drive the vehicle. A tractive force will act on each roller in the direction of the tangents at the points of contact of rollers and races, the output force exerted by race 26 and by race 25 being clockwise,—the same as the input force exerted by race 27. The tractive forces exerted on each roller are transmitted to the supporting arms 71 and 71a, sleeve 70 and collar 102. As the assembly of arms, sleeve and collar may move angularly about the axis of shaft 22, surfaces 101 on collar 102 are angularly diplaced with respect to surfaces 100 on thrust sleeve 50 in response to the tractive forces. Since the collar 102 cannot move axially forward on shaft 22 because of the resistance of shoulder 106 on the shaft and the thrust bearing 105 between said collar and shoulder, the angular movement of the collar 102 is converted thru balls 104 and said cam surfaces 100, 101, into an endwise rearward movement of sleeve 50. Sleeve 50 moving rearward moves the inner ends of levers 111 rearward and the contact points 113 forward thus applying force tending to move race 26 toward race 27. At the same time levers 111 apply force to contact points 112 thus forcing member 52 rearward and with it collar 60, nut 62, shaft 22 and race 25. The pressure of race 25 on rollers 81a may move these rollers bodily since the arms 71a may move axially of the sleeve 70. And the pressure of rollers 81a, transmitted to drive race 27, may cause the drive race to move axially and press against the rollers 81 and 810. Thus the tractive forces acting upon the intermediate rollers produce a torque, which acts thru the cam surfaces 101, upon balls 104 and cam surfaces 100 to apply an equal quantity of pressure in opposite directions to races 26 and 25 which are thereby drawn toward each other so as to clamp between them the rollers and center race and apply equal pressures between races and rollers at all points of tractive contact.

Assuming, for purposes of exposition, that a force of 1,000 lbs. is applied to thrust member 50 tending to force it rearward, and of course an equal force of 1,000 lbs. applied to shaft 22 to force it forward; and assuming that levers 111 have a mechanical advantage of 10 to 1, 10,000 lbs. of pressure will be applied thru said levers to race 26 tending to force it axially forward against rollers 810 and 81, and 11,000 lbs. will be applied thru said levers to shaft 22 tending to force it rearward, thus applying a force of 10,000 lbs. equally distributed between rollers and races in the directions to maintain equal traction between rollers and races at all points of tractive contact. The additional 1,000 lbs. tending to force shaft 22 rearward will, of course, be canceled by the 1,000 lbs. tending to force said shaft forward.

If $Ti$ represents the input tractive force exerted tangentially by the race 27 on a roller 80 and $To$ represents the output tractive force exerted in the same sense on the same roller 80 at a diametrically opposite point, it is clear that a total tractive force of $Ti$ plus $To$ will be exerted at the center of the roller tending to displace it bodily in the direction of the tractive forces and that this force $Ti$ plus $To$ will be applied to the thrust tube 50 augmented by the mechanical advantage afforded by the lever represented by the arm 71 (or 71a) acting thru the radial distance of the roller center from the axis of shaft 22 and by the mechanical advantage afforded by the cam surfaces 100 and 101. With three races and six rollers as shown, the force applied to thrust tube 50 by one roller would be multiplied by six. In the construction described, therefore, the axial loading force applied to the races is directly proportional to the sum of the tractive forces applied to the transmission rollers.

It will readily be perceived that the force applied to each roller supporting arm at the roller center is the sum of the forces $Ti$ and $To$ not only in the 1:1 ratio position shown in Fig. 1, but also in every other ratio position of the roller.

The loading pressure, however, assumed for purpose of illustration to be 10,000 lbs. as applied by levers 111, will be transmitted directly to the contact surfaces of races and rollers when occupying the ratio position shown in Fig. 1, without diminution or augmentation. But, when the planes of the rollers are at an oblique angle to the axis of shaft 22, it will be apparent that the loading force at the surfaces of contact between races and rollers will be increased because of the mechanical advantage available when the planes of the rollers are disposed at oblique angles to the shaft axis. However, the axial loading force exerted by levers 111 upon the races is always the same for a given tangential force exerted on the rollers although applied to the contact areas between rollers and races with different degrees of mechanical advantage for different ratio positions of the rollers.

Having disclosed at this time a preferred embodiment of my invention and described the operation thereof, I claim:

1. In friction power transmission mechanism, the combination of a fixed support; a shaft journaled therein; driving and driven races in axial alinement with the shaft, one of said races being rotatable with respect to the shaft and the other keyed thereto; rollers in rolling contact with the races; radially extending roller supporting means sleeved upon the shaft and capable of limited angular movement with respect to the shaft axis in response to tangential tractive forces exerted between races and rollers; an axially movable thrust member keyed to the fixed support; torque loading devices disposed between said roller supporting means and axially movable thrust member, opposed surfaces of said roller supporting means and thrust member having cam like contours separated by rolling bodies; and means responsive to movement of the thrust member for applying loading pressure to races and rollers.

2. In friction power transmission mechanism the combination of a fixed support; a shaft journaled therein; driving and driven races coaxial with the shaft axis, one of said races being rotatable with respect to the shaft; a torque transmitting member fixed to the shaft and keyed to the other race so that the latter may move axially with respect to the shaft; rollers in rolling contact with the races; radially extending roller supporting means sleeved upon the shaft and anchored to the fixed support so as to be capable of limited angular movement with respect to the shaft axis in response to tangential tractive forces exerted between races and rollers; an axially movable thrust member keyed to the fixed support comprising a sleeve surrounding the shaft and passing thru the center of the axially movable race; torque loading devices disposed between opposing surfaces of roller supporting means and thrust member constructed and arranged to convert angular movement of the roller supporting means into an axial movement of the thrust member; and means, disposed between the torque transmitting member fixed to the shaft and the race keyed to said member, responsive to the movement of the thrust member for applying loading pressure to races and rollers.

3. In friction power transmission mechanism, the combination of a fixed support; a shaft journaled therein; driving and driven races coaxial with the shaft axis one of which is axially movable on the shaft; rollers in rolling contact with the races; radially extending roller supporting means sleeved upon the shaft and capable of limited angular movement with respect to the shaft axis in response to tangential tractive forces exerted between races and rollers; an axially movable thrust member keyed to the fixed support comprising a sleeve surrounding the shaft and passing thru the center of said axially movable race; torque loading devices disposed between opposing surfaces of roller supporting means and thrust member constructed and arranged to convert angular movement of the roller supporting means into an axial movement of the thrust member; an abutment member fixed to the shaft and axially spaced from the axially movable race; and levers operated by the thrust member disposed between the axially movable race and the abutment member spaced therefrom, said levers acting upon the race and the abutment member for applying loading pressure to races and rollers.

4. In friction power transmission mechanism the combination of a fixed support; a shaft journaled and axially movable therein; axially spaced end races torsionally fixed to the shaft, one of said races being axially movable on the shaft; a central race rotatable about the shaft; friction rollers disposed between the central race and the end races; roller supporting means comprising a sleeve capable of limited angular movement surrounding the shaft and passing thru the central race, said sleeve having a set of radial roller supporting arms at each side of the central race, said sets being torsionally rigid with the sleeve but capable of axial movement with respect to one another; a collar torsionally fixed to the sleeve but adapted for limited axial movement relative thereto; an abutment shoulder on the shaft arranged to prevent axial movement of the collar with respect to the shaft in one direction, an axially slidable thrust member keyed to the fixed support, torque loading devices disposed between said collar and said thrust member constructed and arranged to convert angular movement of the roller supporting means into an axial movement of said thrust member, and means responsive to the movement of said thrust member and acting upon said shaft and said axially movable end race to move the end races toward each other.

5. In friction power transmission mechanism the combination of a fixed support; a shaft journaled and axially movable therein; axially spaced end races torsionally fixed to the shaft, one of said races being axially movable on the shaft; a central race rotatable about the shaft; friction rollers disposed between the central race and the end races; roller supporting means comprising a sleeve capable of limited angular movement surrounding the shaft and passing thru the central race, said sleeve having a set of radial roller supporting arms at each side of the central race, said sets being torsionally rigid with the sleeve but capable of axial movement with respect to one another; a collar torsionally fixed to the sleeve but adapted for limited axial movement relative thereto; an abutment shoulder on the shaft arranged to prevent axial movement of the collar with respect to the shaft in one direction; an axially slidable thrust sleeve on the shaft keyed to the fixed support and extending thru the center of the axially movable race; torque loading devices disposed between said collar and said thrust sleeve constructed and arranged to convert the angular movement of the roller supporting means into an axial movement of said thrust sleeve, and power multiplying means operable by the thrust sleeve, said power multiplying means acting upon the shaft and axially movable race to move the end races toward each other.

6. In friction power transmission mechanism the combination of a fixed support, a shaft journaled and axially movable therein; axially spaced end races torsionally fixed to the shaft, one of said races being axially movable on the shaft; a central race rotatable about the shaft; friction rollers disposed between the central race and the end races; roller supporting means comprising a sleeve capable of limited angular movement surrounding the shaft and passing thru the central race, said sleeve having a set of radial roller supporting arms at each side of the central race, said sets being torsionally rigid with the sleeve but capable of axial movement with respect to one another; a collar torsionally fixed to the sleeve but adapted for limited axial movement relative thereto; an abutment shoulder on the shaft arranged to prevent axial movement of the collar with respect to the shaft in one direction; a torque and thrust receiving abutment fixed to the shaft and keyed to the axially movable race; an axially slidable thrust sleeve keyed to the fixed support and extending thru the center of the axially movable race; torque loading devices disposed between said collar and said thrust sleeve constructed and arranged to convert angular movement of the roller supporting means into an axial movement of said thrust sleeve; and power multiplying levers disposed between said torque and thrust receiving abutment and said axially movable race and arranged to be operated by the thrust sleeve and to bear upon the abutment and axially movable race and exert pressure thereon respectively in opposite directions.

7. In friction power transmitting mechanism the combination of a fixed support; a shaft journaled and axially movable therein; axially spaced end races torsionally fixed to the shaft, one of said end races being axially movable thereon; a central race rotatable about the shaft and capable of slight axial movement thereon; friction rollers disposed between the central race and the end races; roller supporting means comprising a sleeve surrounding the shaft and passing thru the central race, said sleeve having a set of radial roller supporting arms at each side of the central race, that set of arms between the central race and the race axially movable on the shaft being fixed to the sleeve and the other set being axially movable thereon; means for anchoring the sleeve to the fixed support so that it may have a limited angular movement; an abutment shoulder on the shaft; a thrust collar bearing against the abutment shoulder, a connection between the sleeve and said thrust collar compelling the collar and sleeve to move together angularly but permitting limited relative axial movement; an axially movable thrust sleeve passing thru the center of the axially movable race; torque loading devices disposed between the opposed ends of said thrust collar and sleeve, and power multiplying means disposed in position to be operated by said thrust sleeve arranged to move said shaft and slidable race in opposite directions in order to draw the end races toward each other.

8. In race and roller power transmission mechanism, the combination of coaxial driving and driven races one of which is susceptible of axial movement with respect to the other; transmission rollers in tractive contact with said races; roller supporting means yieldable to tangential tractive forces exerted by the races and rollers; torque loading means tending to force the races toward one another in response to yielding of said roller supporting means, said torque loading means comprising cams and a mechanical advantage means arranged to transmit the axial force developed by operation of the cams to the axially movable race.

CARMER CRISWELL.